US011892966B2

(12) United States Patent
Srinivasan et al.

(10) Patent No.: US 11,892,966 B2
(45) Date of Patent: Feb. 6, 2024

(54) MULTI-USE CHIP-TO-CHIP INTERFACE

(71) Applicant: XILINX, INC., San Jose, CA (US)

(72) Inventors: Krishnan Srinivasan, San Jose, CA (US); Ygal Arbel, Morgan Hill, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/551,132

(22) Filed: Dec. 14, 2021

(65) Prior Publication Data

US 2023/0141709 A1 May 11, 2023

Related U.S. Application Data

(63) Continuation-in-part of application No. 17/454,450, filed on Nov. 10, 2021, now abandoned.

(51) Int. Cl.
*G06F 13/36* (2006.01)
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| 5,381,534 | A  | * | 1/1995  | Shi ...................... G06F 9/45537 |
|           |    |   |         | 717/149                                 |
| 8,854,080 | B1 | * | 10/2014 | Hutton ................ G06F 30/3312   |
|           |    |   |         | 326/38                                  |
| 10,185,678| B1 | * | 1/2019  | Stoler ................. G06F 13/4282  |
| 10,698,853| B1 | * | 6/2020  | Grohoski ............... G06F 12/10    |
| 2007/0143577 | A1 | * | 6/2007 | Smith ................. G06F 15/7867  |
|           |    |   |         | 712/10                                  |

OTHER PUBLICATIONS

Bousdras, G., et al., "Template architectures for highly scalable, many-core Heterogeneous SoC: Could-of-Chips," 2018 13th International Symposium on Reconfigurable Communication-centric Systems-on-Chip (ReCoSoC), 2018, pp. 1-7.
Kim, J. et al., "Architecture, Chip, and Package Codesign Flow for Interposer-Based 2.5-D Chiplet Integration Enabling Heterogeneous IP Reuse," in IEEE Transactions on Very Large Scale Integration (VLSI) Systems, vol. 28, No. 11, pp. 2424-2437, Nov. 2020.
Hemsoth, Kim, "AMD on Why Chiplets—and Why Now," The Next Platform, Jun. 9, 2021, 7 pages, https://www.nextplatform.com/2021/06/09/amd-on-why-chiplets-and-why-now/.

* cited by examiner

*Primary Examiner* — Henry Tsai
*Assistant Examiner* — Dean Phan
(74) *Attorney, Agent, or Firm* — Patterson + Sheridan, LLP

(57) ABSTRACT

Systems, methods, and apparatuses are described that enable IC architectures to enable a single anchor to connect to and accept a variety of chiplets at any port by way of a programming model that enables the anchor or chiplet to dynamically adapt to configurations, requirements, or aspects of any coupled component and provide an interface for the coupled components.

20 Claims, 9 Drawing Sheets

MULTI-USE CHIP-TO-CHIP INTERFACE

CROSS REFERENCE TO RELATED APPLICATION

This Application is a continuation-in-part of U.S. Non-Provisional application Ser. No. 17/454,450, filed on Nov. 10, 2021, the entire disclosure of which is incorporated herein by reference.

TECHNICAL FIELD

Examples of the present disclosure generally relate to chip-to-chip interfaces for integrated circuits (ICs) that enable coupling chiplet ICs (hereinafter "chiplets") to an anchor IC (hereinafter "anchor").

BACKGROUND

As technology evolves, instead of employing a single IC chip including all components and providing all functionalities, recent design methodologies are splitting the IC into one or more chiplets coupled to a common anchor IC. The chiplet comprises an IC specifically designed to be integrated with additional chiplets and an anchor IC to perform functions of a larger IC. Chipmakers may divide the larger IC into the chiplets and utilize the chiplets to perform particular functions or provide functionality to the IC when connected to the anchor. The chiplets may be hardwired to respective locations on or with respect to the anchor. This chiplet-based architecture de-couples the development cycle of the anchor IC from the chiplets, as the chiplets and anchor IC may be fabricated separately rather fabricating the entire integrated circuit on a single larger piece of silicon.

However while such design methodologies may provide additional flexibility to the design of a device by chipmakers, including the IC formed from the anchor and the chiplet, the device employs chiplets that are generally enabled to plug into the anchor with hardwired connections and specific locations. However, such hardwired connections limit flexibility of the device, where chiplets utilize particular connections such that a chip-to-chip interface provided by the anchor includes a limited architecture.

Thus, solutions for improving flexibility between anchors and chiplets are desired.

SUMMARY

Systems, methods, and apparatuses are described that enable IC architectures to enable a single anchor to connect to and accept a variety of chiplets at any port by way of a programming model that enables the anchor or chiplet to dynamically adapt to configurations, requirements, or aspects of any coupled component and provide an interface for the coupled components.

In one example, an integrated circuit (IC) is provided that includes an anchor IC and a plurality of chiplet ICs. The anchor IC includes a processor IC and a memory IC configured to store one or more programs that, when executed by the processor IC, perform one or more operations. The plurality of chiplet ICs are configured to provide a function when coupled with the anchor IC via a plurality of chip-to-chip (C2C) interfaces. Each chiplet IC includes one or more requirements for a corresponding C2C interface of the plurality of C2C interfaces via which the chiplet IC connects to the anchor IC; and one or more performance requirements for the anchor IC. Each C2C interface is configured to receive one chiplet IC of the plurality of chiplet ICs regardless of a functionality of the one chiplet; and individually couple the one chiplet IC to the anchor IC. The one or more operations comprise a programmable option for the anchor IC to interface in different combinations and arrangements of the plurality of chiplet ICs to provide different functions.

In another example, an electronic device is provided that includes an anchor IC and a plurality of chiplet ICs. The chiplet ICs are configured to provide a function when coupled to the anchor IC via a plurality of chip-to-chip (C2C) interfaces. Each chiplet IC includes one or more requirements for a corresponding C2C interface of the plurality of C2C interfaces via which the chiplet IC couples to the anchor IC; and one or more performance requirements for the anchor IC. Each C2C interface is configured to receive one chiplet IC of the plurality of chiplet ICs regardless of a functionality of the one chiplet; and individually couple the one chiplet IC to the anchor IC. The anchor IC includes one or more programmable options to interface in different combinations and arrangements with the plurality of chiplet ICs to configure features and functions of the electronic device.

In yet another example, a method is provided that includes configuring each chiplet of a plurality of chiplet ICs to provide a corresponding function when coupled to an anchor IC via a plurality of corresponding chip-to-chip (C2C) interfaces; configuring each chiplet IC of the plurality of chiplet ICs to have one or more requirements for corresponding C2C interface of the plurality of C2C interfaces via which the chiplet IC couples to the anchor IC; configuring each chiplet IC of the plurality of chiplet ICs to have one or more performance requirements for the anchor IC; configuring each C2C interface of the plurality of C2C interfaces to receive one chiplet IC of the plurality of chiplet ICs regardless of a functionality of the one chiplet and individually couple the one chiplet IC to the anchor IC; and configuring the anchor IC to provide one or more programmable options to interface in different combinations and arrangements with the plurality of chiplet ICs to configure features and functions of a device comprising the anchor IC and the chiplet ICs.

BRIEF DESCRIPTION OF DRAWINGS

So that the manner in which the features recited above can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
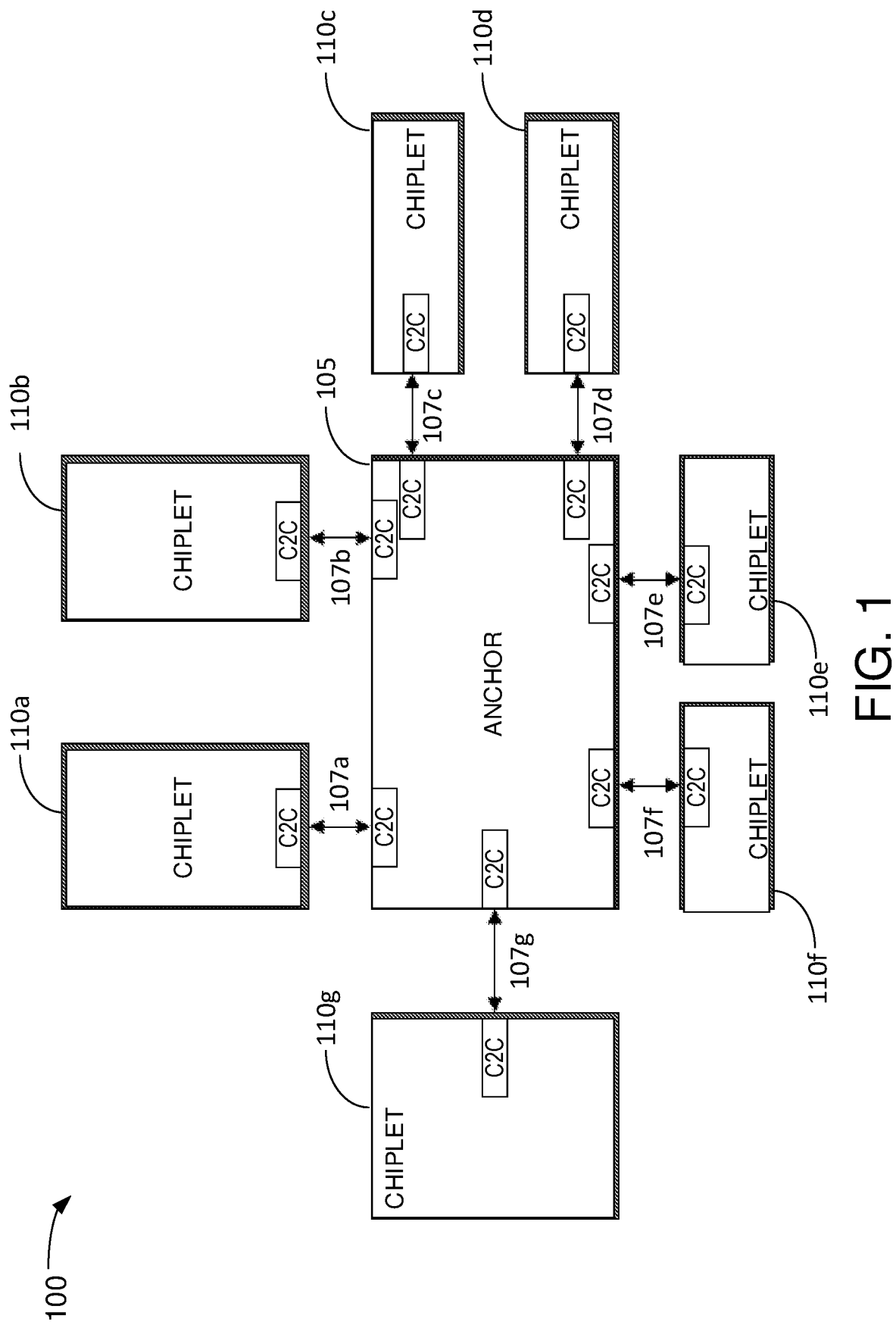
FIG. 1 is a block diagram of a multi-chip integrated circuit (IC) including an anchor IC and a plurality of chiplet ICs, according to an example embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

For integrated circuits (ICs), chiplet IC (hereinafter "chiplet") and anchor IC (hereinafter "anchor") based designs enable use of templated architectures to produce large circuits from smaller, duplicated or identical chiplets. The chiplet is part of an overall IC design framework that performs one or more specific functions, but requires an external entity (i.e., the anchor) to render the functions useful. For example, a chiplet may perform acceleration of a machine learning function, but will require the anchor to program its registers, provide interface to memory, etc. Conversely, the anchor is configured as a superset of a conventional IC, as certain functionality required for the IC design framework is not present but relegated to the chiplets interfaced with the anchor. Not only does the anchor perform most of functions of a conventional IC (for example, CPU, memory controller etc.), the anchor also has logic to interface with at least one chiplet. In some example, an anchor is able to interface with 10s of chiplets. However, such architectures may not be programmable and, thus, may not be able to support different use cases, such as dynamic selection of chiplets for placement at any port of the anchor. Such architectures may limit interchangeability of anchor and chiplet ICs without changes to the hardware.

Systems, methods, and apparatuses described herein enable IC architectures that provide various benefits, such as enabling a single anchor to connect to and accept a variety of chiplets at any port by way of a programming model that enables the anchor or chiplet to dynamically adapt to configurations, requirements, or aspects of any coupled component and provide an interface for the coupled components. Thus, instead of limiting the anchor to a fixed configuration or layout or predetermined selection of chiplets that are hardwired at specified ports or locations of the anchor, the anchor can integrate with different combinations of chiplets to form various devices. Additionally, a given anchor and chiplet configuration can be reprogrammed to support multiple different use cases, interfaces, and data flows when configured using a software programming model. For example, the software programming model can enable support by the anchor and chiplet of multiple configuration options that may be turned on or off (for example, at manufacture or at runtime) based on detection of various conditions, such as detected chiplets and the like. The software programming model further enables an end user of the anchor and chiplets to quickly assemble various devices having different anchor and chiplet combinations without requiring manufacturing modifications or changing the chiplets or anchor by adapting options of the anchor and/or the chiplets. These features increase versatility and flexibility of the device formed by the anchor and chiplet and can reduce time to market for corresponding devices considerably. Furthermore, the software programming model enables various orientations and configurations of chiplets with the anchor without a hardware change of the anchor, where the software programmability instead configures C2C interfaces of the anchor and corresponding chiplets for faithful transfer of information.

FIG. 1 is a block diagram of a multi-chip integrated circuit (IC) 100 including an anchor IC 105 (hereinafter "anchor") and a plurality of chiplet ICs 110 (hereinafter "chiplets"), according to an example embodiment. The anchor 105 includes circuitry comprising one or more data processing blocks, such as a processing system or subsystem (PS), a memory system (for example, including a memory controller), and the like that the anchor 105 uses to handle data provided by or to one or more of the plurality of chiplet 110.

Each chiplet 110 includes circuitry that may comprise a dedicated logic device or device type configured to serve a particular purpose or provide particular functionality, such as an data processing engine (DPE) chiplet 110a configured to provide artificial intelligence (AI) or machine learning (ML) functionality. Other chiplets 110 may provide various other functionality, such as Ethernet communications via an Ethernet chiplet 110b, memory functionality via a memory chiplet 110c, and the like. The chiplets 110 may be connected to the anchor 105 via physical or hardwired or similar interfaces 107. In some embodiments, one or more of the anchor 105 and the chiplet 110 comprises a chip-to-chip (C2C) interface, as shown in FIG. 1. The C2C interface may be programmable (for example, via a programming software model employing a programming interface for the end user). In some embodiments, the C2C interface comprises digital and analog components that enable communication between two components of the IC 100, such as two anchor ICs 105 or an anchor IC 105 and a chiplet IC 110.

One advantage of employing a chiplet 110 architecture is that the architecture decouples development cycles of the anchor 105 and the chiplet 110. For example, a developer of the anchor 105 may develop and generate the anchor 105 independent from development of the chiplet 110. Instead, the anchor 105 and the chiplet 110 merely employ the C2C interface that is defined clearly and consistently to enable communications between the anchor 105 and coupled chiplet 110. This provides flexibility in creating a device IC based on the anchor 105 and chiplets 110. Furthermore, the flexibility may be provided with different levels of granularity. For example, the flexibility may involve different chiplets 110 in different arrangements, different mappings for communications between chiplets 110 and the anchor 105, and the like.

The C2C interface may be constrained by one or more factors, including an area on each component, bandwidth the C2C interface is capable of providing, number of connections, and the like. Such factors of the C2C interface may limit a number of signals capable of passing through the C2C interface at a given time. High bandwidths can be obtained by running the C2C interface at a high data rate. For example, a C2C interface can be designed to run at 8 gigabits per second (Gbps) per wire with 42 wires per data word for a total data rate of approximately 328 Gbps.

Each chiplet 110 may be designed to perform its corresponding functionality with custom or differentiating requirements with respect to performance and interface requirements. For example, the Ethernet chiplet 110b can be highly latency sensitive and, therefore, request transactions with the anchor 105 to occur without or with little added overhead from the anchor 105 or from the C2C interface. On the other hand, other chiplets 110, such as the DPE chiplet 110a that access the anchor 105 may have different performance and functional requirements than the Ethernet chiplet 110b and even from other DPE chiplets 110a.

In the multi-chip IC 100 shown, the anchor 105 supports seven chiplets 110a-110g (though any other number of chiplets 110 may be supported). In some embodiments, the chiplets 110a-110g may include a homogenous arrangement of chiplets 110 (for example, an arrangement of a single type of chiplet 110) or a heterogeneous arrangement of chiplets 110 (for example, an arrangement of more than one type of chiplet 110).

Figure 2:
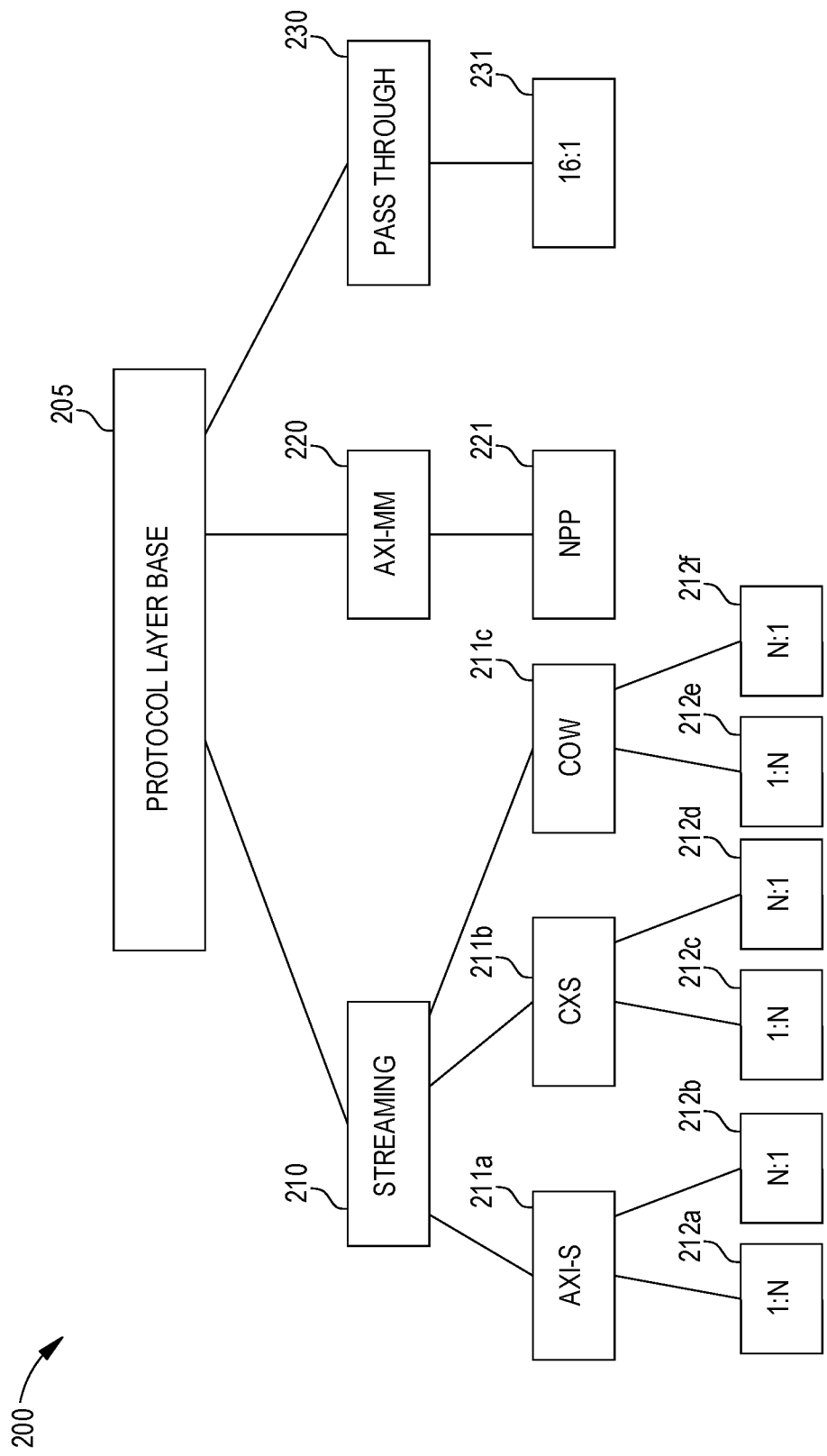
FIG. 2 depicts a block diagram of a hierarchy of data flow options supported by a chip-to-chip (C2C) interface employed in the multi-chip IC of FIG. 1, according to an example embodiment.

FIG. 2 depicts a block diagram of a hierarchy 200 of data flow options supported by a C2C interface, employed in a multi-chip IC, such as the multi-chip IC 100 of FIG. 1, according to an example embodiment. Thus, the hierarchy 200 identifies interface options available between an anchor IC and corresponding chiplet ICs of the multi-chip IC. Broadly, three categories of C2C interface options are supported—streaming (node 210), an Advanced eXtensible Interface (AXI-MM) (node 220), and Pass-through (node 230). Within each category, multiple sub-categories of options are supported. For example, the streaming protocol enables selection of an Advanced eXtensible Interface streaming (AXI-S) based streaming protocol (node 211a), a Credited eXtensible Stream (CXS) streaming protocol (node 211b), or just use a collection of wires (COW) streaming protocol (node 211c) without attaching any protocol semantics to the wires. Within each protocol, the user may choose different aggregation options, such as, aggregate multiple incoming flows into one outgoing flow, or vice versa.

In some embodiments, the C2C interface can be configured into an AXI-MM based interface (node 220) or a pass-through interface (node 230) that does not perform any protocol specific operation, or the AXI-MM based interface can be configured for a NoC packet protocol (NPP) (node 221). The C2C interface may have many flows and be configured into a combination of one or more options described in FIG. 2.

The nodes 211a, 211b, and 211c further comprise leaf nodes 212. Specifically, each of the AXI-S node 211a, the CXS node 211b, and the COW node 211c includes a pair of leaf nodes 212a and 212b, 212c and 212d, and 212e and 212f, respectively. Each pair includes a leaf node 212a, 212c, or 212e that identifies a variant "1:N" while the other leaf node 212b, 212d, or 212f identifies a variant "N:1". In view of the programmability of the C2C interface, and the inclusion of the available protocols such as those described here, the multi-chip IC supports all of the listed options without requiring any change to the hardware. A software programming interface may be implemented, for example, via the processing circuitry and the memory circuitry, to enable selection of one of the available options at run-time, manufacture, and the like.

As introduced above, the embodiments described herein will allow creation of devices with significant reduction in creation times and subsequent optimization and customization. For example, a device dedicated to ML applications may comprise one or more DPE chiplets, such as the DPE chiplets 110a, coupled to an anchor, such as the anchor 105, and utilize the software programming interface to configure the C2C interfaces of the anchor and/or the DPE chiplet 110a so that there is data flow between components of the anchor and the DPE chiplet. On the other hand, a different use case could be addressed with a low latency Ethernet chiplet, such as the Ethernet chiplet 110b or a GT chiplet IC 110c, connected to the anchor IC and the software programming interface could be used to employ the software model to map streaming data flows.

The embodiments described herein allow for different combinations or configurations of chiplets to be connected to an anchor without changing an architecture of the anchor or the chiplets. Instead, the anchor or the chiplet comprises one or more programmable registers as part of the C2C interface used to seamlessly connect the chiplet to the anchor.

As introduced above, the interface that connects the chiplets to the anchor supports multiple types of data flows. For example, a chiplet may be programmed to operate with a particular data flow, such as an AXI-S (AXI streaming) data flow, a CXS data flow, an NPP data flow, and so forth, as indicated in FIG. 2. The C2C interface, whether at the chiplet or the anchor, thus, may enable the chiplet having the programmed data flow to transmit and receive data with one or more data words of the anchor. As described herein, the programmable registers for the anchor, being part of the C2C interface, enable various functionality for the anchor, including mapping of the one or more data words to the programed data flow. Thus, the anchor can be programmed to handle the coupled chiplet and any programmed dataflow for the chiplet. Furthermore, the interface can have multiple flows and a combination of options can be used in configuring the interface.

Each C2C interface between the anchor and the chiplet may support multiple data flows, as introduced above. For example, the C2C interface may support a configuration of a number of data words (for example, one, two, four, or any other number of data words) mapped to an AXI-S, CXS, or COW stream, which then goes through a clock domain crossing (CDC) and up-sizer (or similar path) to a fabric of the multi-chip IC. Alternatively, or additionally, the C2C interface may support a data flow comprising a number (such as two) of spatial data words mapped to a number (such as three) of spatial AXI-S or CXS streams, which then pass through the CDC and map to a custom IC. Further, the C2C interface may support a data flow comprising a number (such as one) of data words mapped to a number (such as one) of non-flow controlled sets of wires in a 16:1 mode (for example, a wide data path mode) or one data word mapped to an NPP stream.

The programmable registers of the C2C interface may be configured or programmed according on a mapping option at boot time or time of initialization of the multi-chip IC. Therefore, aspects of the anchor and chiplets described herein allow for multiple use-case mappings for the multi-chip IC. Depending on a traffic profile and/or specified requirements, certain C2C interfaces in the anchor (and chiplet) could be configured to be either streaming or memory mapped, for example.

Accordingly, the programmable registers of the C2C interfaces may be located at different locations of the anchor at which chiplets can be coupled to operate with different configurations based on the connected chiplet at a given location. Furthermore, the different interfaces at different locations may be programmed to accommodate different width data flows. For example, a protocol stream having a single wide data flow, such as AXI-S, includes a width. In some embodiments, the AXI-S protocol data flow can be defined as being 1024 bits wide. Alternatively, the interface could be 256 bits wide, 512 bits wide, 2048 bits wide, and so forth. For example, the programming interface can program the C2C interface to handle data flows that include AXI-S with 1024 bit width and CXS with 512 bit width, and the C2C interface can be programmed to handle the chiplets regardless of the corresponding data flow and width without any changes to the chiplet itself.

Such a configuration of the C2C interface enables scaling according to a number of protocols as well as according to a number of widths for each protocol. By integrating the anchor with the C2C interface, the anchor can be programmed accordingly. The programming interface may be used to identify a configuration of a particular data flow and have the anchor programmed for the corresponding chiplets without any changes to the chiplets themselves. In some embodiments, the programming interface identifies the data flow for a connected chiplet automatically without interaction of a user.

Within different interface options, various operation modes may be supported by the C2C interfaces (and thus, the anchor or chiplet). For example, the C2C interface may comprise a physical (PHY) layer (Low-level/analog+digital), a link (LINK) layer (Digital, Single DW Functions), and a protocol (PROTOCOL) layer (Digital, Multi-DW). Each layer may have particular specifications and/or functions. This delineation allows the C2C interface to implement different modes of operation that are most suitable to a specific layer, providing additional flexibility when implemented with the aspects described herein.

For example, the LINK layer can implement one or more signal integrity methods, such as a data bus inversion (DBI). In some embodiments, the PROTOCOL layer is used to choose to implement (or not implement) one or more error correction schemes or error correction codes (ECCs). Depending on data flow requirements between the anchor and the chiplet, operations may be divided among these layers. As with the C2C interface configurations, the operation modes can be selected by one or more programming configuration registers, for example, at boot or multi-chip IC implementation. In some embodiments, may have PHY, LINK, and PROTOCOL layer specific options defined by or selected from Tables 1-3 below.

TABLE 1

Example PHY Layer Configuration Options

| Gearbox Ratio | AC2C Speed [GT/s] | DW pin count | Link layer pin count | Link layer clock [MHz] |
|---|---|---|---|---|
| 2 | 2.0 | 42 | 84 | 1000 |
| 4 | 4.0 | 42 | 168 | 1000 |
| 8 | 8.0 | 42 | 336 | 1000 |
| 16 | 8.0 | 42 | 672 | 500 |

The wires, for example, of a link between the chiplet and the anchor may operate at a specific frequency or speed that is generally higher than a speed at which the chiplet and/or the anchor can process data. Thus, the wires may transfer data at a speed higher than the speeds of the chiplet and/or the anchor, which may comprise a design constraint of the multi-chip IC. A ratio of the speeds of the wires to the chiplet and anchor may correspond to a gearbox or gear ratio. For example, if the wires operate at 8 GHz and the chiplet and anchor operate at 1 GHz, the gear ratio is 8. Similarly, of the wires operate at 8 GHz and the chiplet and anchor operate at 500 MHz, the gear ratio is 16. Thus, in Table 1, the gearbox ratio identifies the speed of the wires with respect to the speed of the chiplet and anchor. This gearbox ratio corresponds to transfer speeds in a second column of Table 1 as it relates to the link layer clock of a fifth column of Table 1. Similarly, the gearbox ratio may define a relationship between the data word pin count and the link layer pin count found in columns 3 and 4, respectively, of the Table 1. By enabling various configurations in Table 1 as being selectable at implementation or dynamically during operation, the multi-chip IC can be increasingly flexible to specific device configurations with respect to chiplets, orientations, and the like.

Tables 2 and 3 identify example configuration options for the LINK and PROTOCOL layers. In some embodiments, the C2C interface comprises different sets of wires that can be used in different use cases or modes. Specific logic may be used to select between the different modes of Tables 2 and 3. As shown in Table 2, the logic may be used to enable or activate one or more options as part of each mode, where, as options are disabled or deactivated, additional bits, corresponding to the disabled options, are available to transfer payload between the chiplet and the anchor. Table 3 provides additional options to enable or disable framing and ECC for a particular C2C interface. In some embodiments, the programming interface may be used to apply the individualized configuration options to a single C2C interface between the anchor and a particular chiplet or to all C2C interfaces of the anchor and any chiplets connected thereto.

TABLE 2

Example LINK Layer Configuration Options

| Mode | Framing | Parity | DBI | Payload bits |
|---|---|---|---|---|
| 0 (default) | Enabled | Enabled | Enabled | 36 |
| 1 | Enabled | Enabled | — | 40 |
| 2 | Enabled | — | — | 41 |
| 3 (Link Layer Bypass) | — | — | — | 42 |

TABLE 3

Example PROTOCOL Layer Configuration Options

| Mode | Framing | ECC |
|---|---|---|
| 0 (default) | Enabled | Enabled |
| 1 | Enabled | Disabled |
| 2 | Disabled | Enabled |
| 3 (Link Layer Bypass) | Disabled | Disabled |

Each option may provide benefits, such as saving on latency if options are disabled, in exchange for the available option. For example, when ECC is disabled, additional errors may occur due to not using error correction codes, but such additional errors may be acceptable by the manufacturer to attain lower latency of such communications between the anchor and the chiplet. In some embodiments, such settings or configuration may be made via the programming interface automatically based on one or more of a coupled chiplet or an end user profile, or the like. In some embodiments, selections between options, etc., may be performed by multiplexing of different signals based on various conditions.

Figure 3:
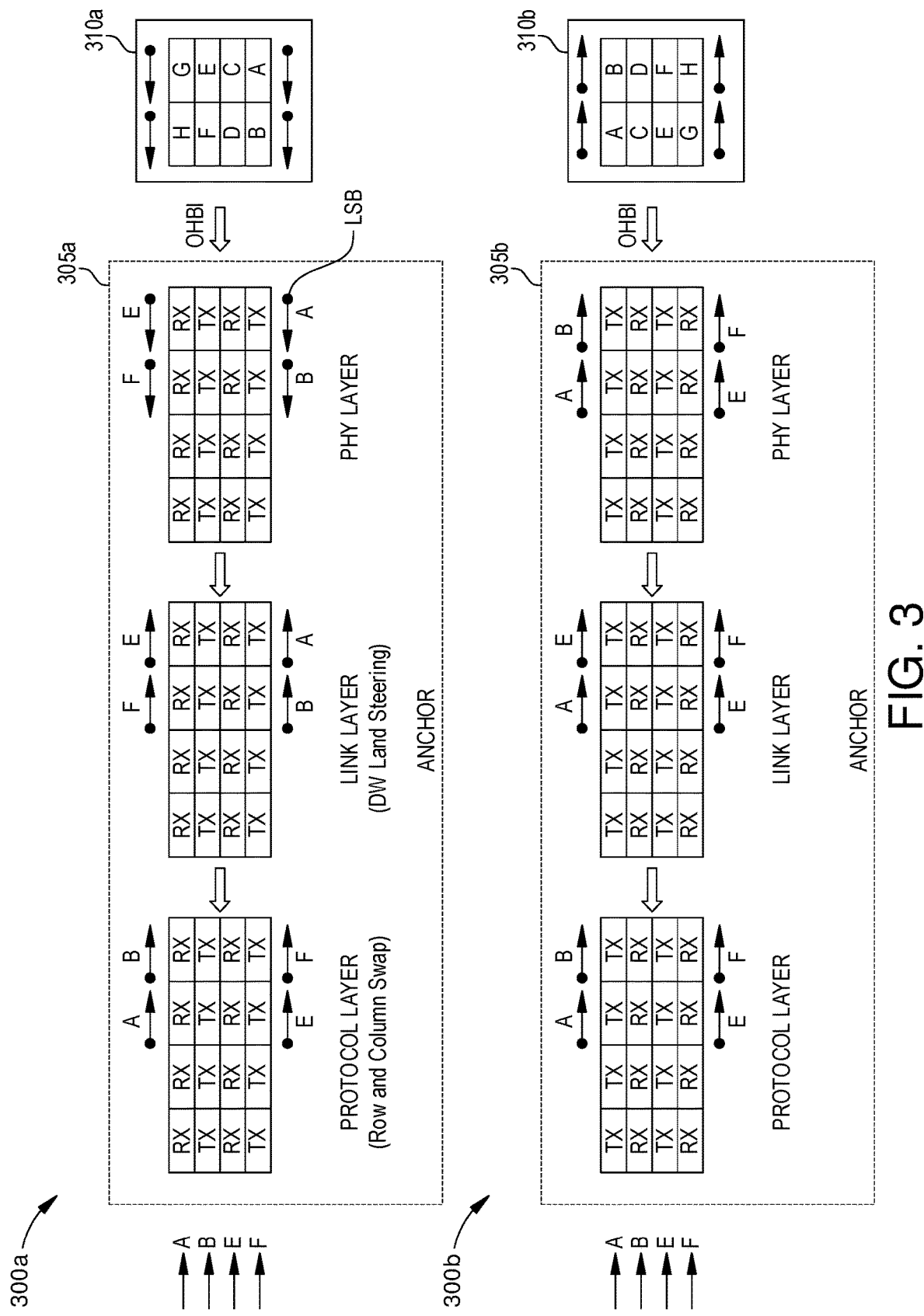
FIG. 3 depicts an example block diagram of a hardware architecture configured to enable seamless integration of a chiplet IC and the anchor IC regardless of orientation of the chiplet IC with respect to the anchor IC when coupled to the anchor IC, according to an example embodiment.

FIG. 3 depicts an example block diagram of a hardware architecture 300 configured to enable seamless integration of a chiplet 310, corresponding to the chiplet 110, with anchor 305, corresponding to the anchor 105, regardless of orientation of the chiplet 310 relative to the anchor 305 when coupled to the anchor 305, according to an example embodiment. In some embodiments, one of the anchor 305 or the chiplet 310 comprises one or more pins and the other of the anchor 305 or the chiplet 310 comprises corresponding ports to enable C2C interfaces, such as the C2C interfaces described with respect to FIG. 1, between the anchor 305 and the chiplet 310. Each of the anchor 305 and the chiplet 310 may have its own C2C interface that comprises a plurality of words, each configurable to be receiving or transmitting, and programmable registers used to configure the plurality of words.

The chiplets 310 and the anchor 305 may be connected via the C2C interfaces by one or more links, which can include wires in different orientations. One of the chiplets 310 may be placed in a true orientation, a mirrored orientation, or a rotated orientation, relative to the anchor 305. The C2C interfaces may compensate for the orientation of the chiplet 310. The C2C interfaces and wire orientations may be described as a floorplan that enables communication of data between connected components. The aspects described herein may be floorplan transparent or agnostic, meaning that the aspects herein enable the chiplet 310 to be connected to the anchor 305 regardless of an orientation of the chiplet 310 relative to the anchor 305 without any change of the chiplet 310. More specifically, regardless of the orientation of the chiplet 310 when connected to the anchor 305, the hardware architecture 300 can be programmed to appropriately route traffic between the chiplet 310 and the anchor 305. For example, where an rotated orientation of the chiplet 310 relative to the anchor 305 results in the pins of the chiplet 310 being flipped with respect to the respective ports of the anchor 305, the ports of the anchor 305, or related connections of the ports, may be switched via a wire switch, or the like. More particularly, the programming interface can be used to program the programmable registers of the C2C interface to map connections such that the ports of the anchor 305 can receive the pins of the chiplet 310 regardless of the orientation of the chiplet 310.

FIG. 3 provides two different example hardware architecture 300a and 300b depicting two different orientation relationships for the anchor 305 and the chiplet 310. Specifically, the hardware architecture 300a includes the anchor 305a having a first programmed floorplan and the chiplet 310a in a first orientation and the hardware architecture 300b includes the anchor 305b having a second programmed floorplan and the chiplet 310b in a second orientation. In the hardware architecture 300b, the chiplet 310b is rotated 180-degrees (or flipped) relative to the anchor 305b as compared to the chiplet 310a relative to the anchor 305a.

In the architecture 300a, when the chiplet 310a is provided with the orientation as shown, the anchor 305a can be programmed, via the programming interface and using the programmable registers of the C2C interface, to appropriately route data to and from the chiplet 310a with the depicted orientation. The chiplet 310a has an orientation of a first (top) row including G and H, a second row including F and E, a third row including D and C, and a fourth (bottom) row including A and B. To accommodate such an orientation, the programming interface programs the registers of the C2C interface such that a first (top) row of registers are receive registers, a second row of registers are transmit registers, a third row of registers are receive registers, and a fourth row of registers are transmit registers. Thus, the anchor 305a can receive data from and provide data to the chiplet 310a.

A data or double word (DW) has a least significant bit (LSB) and a most significant bit (MSB). For example, the DW of 1000000 includes a most significant bit 1000 and a least significant bit 0000. When the DW is rotated, the DW is represented as 00000001 if the DW is simply read out in the same direction as before being rotated (e.g., rotating 10000000 180-degrees results in 00000001, where maintaining the readout direction would result in reading out 00000001 instead of 10000000. The arrows depict how the order of the DW is preserved with respect to rotation of the doing the link and protocol layers of the C2C interface of, for example, the anchor 305a.

For example, a first DW in the anchor 305a is represented by arrows A and B (where A represents the LSB) and a second DW in the anchor 305a is represented by arrows E and F (where E represents the LSB). The arrows show how, as the orientation of the chiplet 310 with respect to the anchor 300 changes, the order and direction of the DWs changes so that the MSB and LSBs of the DWs are communicated appropriately (for example, in the correct order, etc.).

On the other hand, in the architecture 300b, when the chiplet 310b is provided with the orientation as shown (i.e., flipped with respect to the chiplet 310a), the C2C interface can be programmed, via the programming interface and using the programmable registers, to appropriately route data to and from the chiplet 310b with the depicted orientation. The chiplet 310b has an orientation of a first (top) row including A and B, a second row including C and D, a third row including E and F, and a fourth (bottom) row including G and H. To accommodate such an orientation, the programming interface programs the registers of the C2C interface such that a first (top) row of registers are transmit registers, a second row of registers are receive registers, a third row of registers are transmit registers, and a fourth row of registers are receive registers. Thus, the C2C interface can receive data from and provide data to the chiplet 310b.

Thus, any changes needed between the anchor 305 and the chiplet 310 to accommodate orientations of the anchor 305 and the chiplet 310 can be performed via programming of the programmable registers of the C2C interface on either the anchor 305 or the chiplet 310. Based on the description herein, the anchor 305 is able to connect to either orientation of the chiplet 310 based on conditionally invoking lane steering logic based on the orientation of the chiplet 310. This enables the anchor 305 to ensure that ensure that data words, such as those depicted by A, B, E, and F, are connected appropriate to the correct pins of the chiplet 310.

One benefit of the aspects described herein comprise the automatic programming of the programmable registers of the C2C interface based on the coupled chiplets 310 without interaction from a chiplet manufacturer or adjustment of the chiplets 310. For example, the chiplet 310 can be positioned or installed in the first orientation (not-flipped) or in the second orientation (flipped). The programmable registers in the anchor 305 can be reprogrammed as needed to route data words A, B, E, and F to the chiplet 310 according to the appropriate data flow protocol for an interface between the chiplet 310 and the anchor 305. The anchor 305 can be reprogrammed to handle the data flow with the chiplet 310 regardless of configuration of the chiplet without any input or interaction with the chiplet 310 or a corresponding end user.

Figure 4:
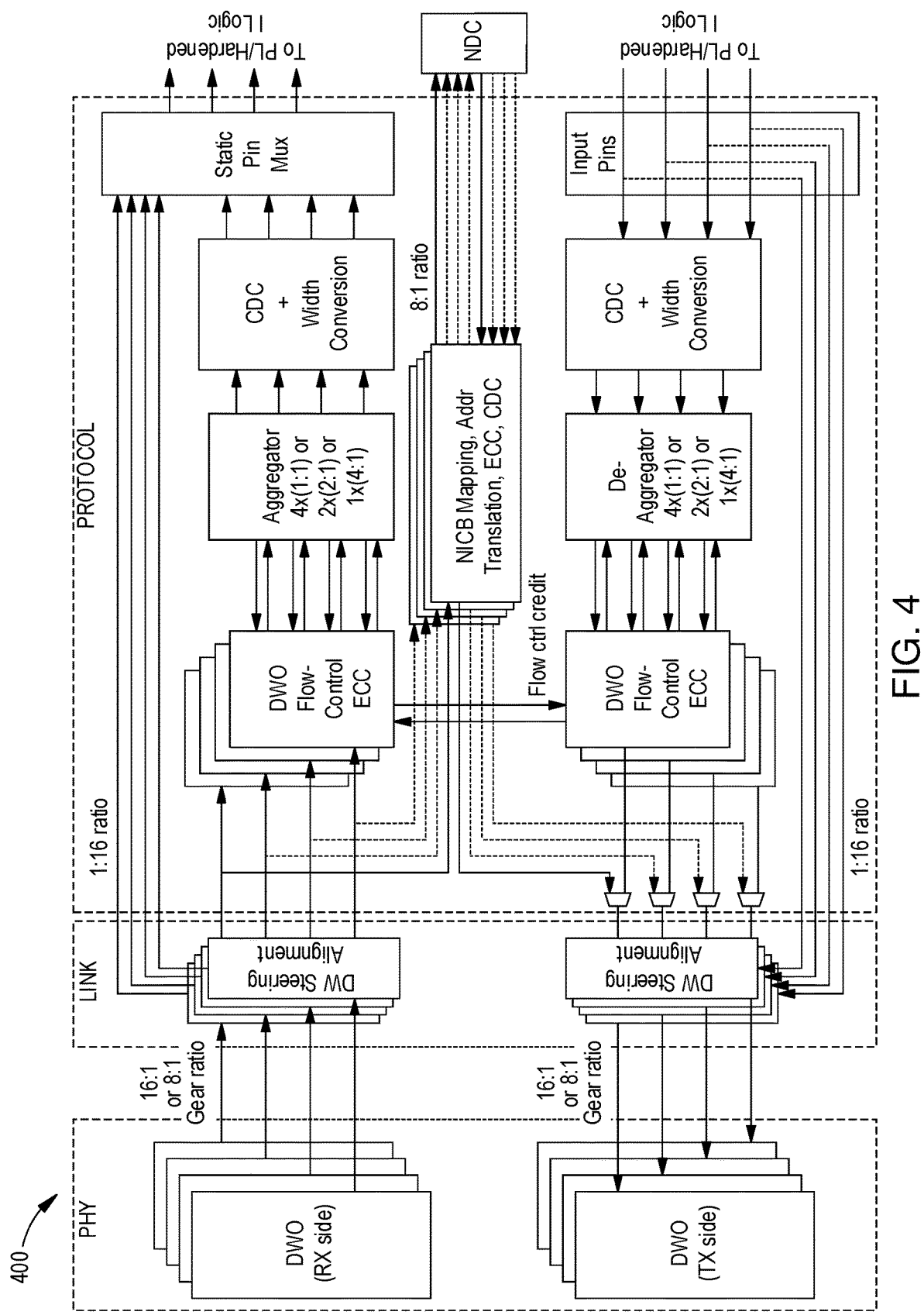
FIG. 4 depicts an example C2C interface architecture 400 that can exist between a chiplet and an anchor, according to an example embodiment.

FIG. 4 depicts an example C2C interface architecture 400 that can exist between a chiplet and an anchor, according to an example embodiment. The architecture 400 includes each of the PHY, LINK, and PROTOCOL layers introduced above. As shown, in the PROTOCOL layer, various blocks are present that enable different data flow protocols, as described or introduced above. For example, based on a selected or identified protocol for a particular chiplet, the C2C interface can be employed to route and/or map traffic according to the protocol for the particular chiplet. Thus, dependent upon the protocol selected, different paths may be used to route data through the PROTOCOL layer.

The C2C interface architecture 400 may correspond to a protocol handling unit (PHU), which comprises 4 transmit DWs and 4 receive DWs as shown in the PHY layer. The PROTOCOL layer may comprise one or more features, such as lane steering (for example, inter-DW lane steering, because intra-DW lane steering may be performed at the LINK layer), framing (for example, up-to 4 DW framing within a PHU) error protection (for example, ECC, where parity is performed at the LINK layer), flow control (for example, credit based flow control at DW, where handshake based flow control at an upper layer (AXIS) is converted to credit based at the DW level), and clocks (for example, where the PROTOCOL layer assumes a different clock from the PL/Hard logic and where a same clock is required per PHY).

Framing may align two or more DWs to ensure that alignment issues caused by various factors, such as interposer routing, and the like, are accounted for. Under framing, a framing signal is occasionally sent to ensure that if the framing signals are not aligned, one of the DWs is delayed until alignment is achieved between the framing signals. In order to align, the framing signals should be temporally separated by at least 2L+1, where L is a maximum framing misalignment interval.

The LINK layer may be used to indicate a gear ratio between the wires of the connection between the chiplet and the anchor to the C2C interface, so the gear ratio will be programmed by configuring the LINK layer.

Figure 5:
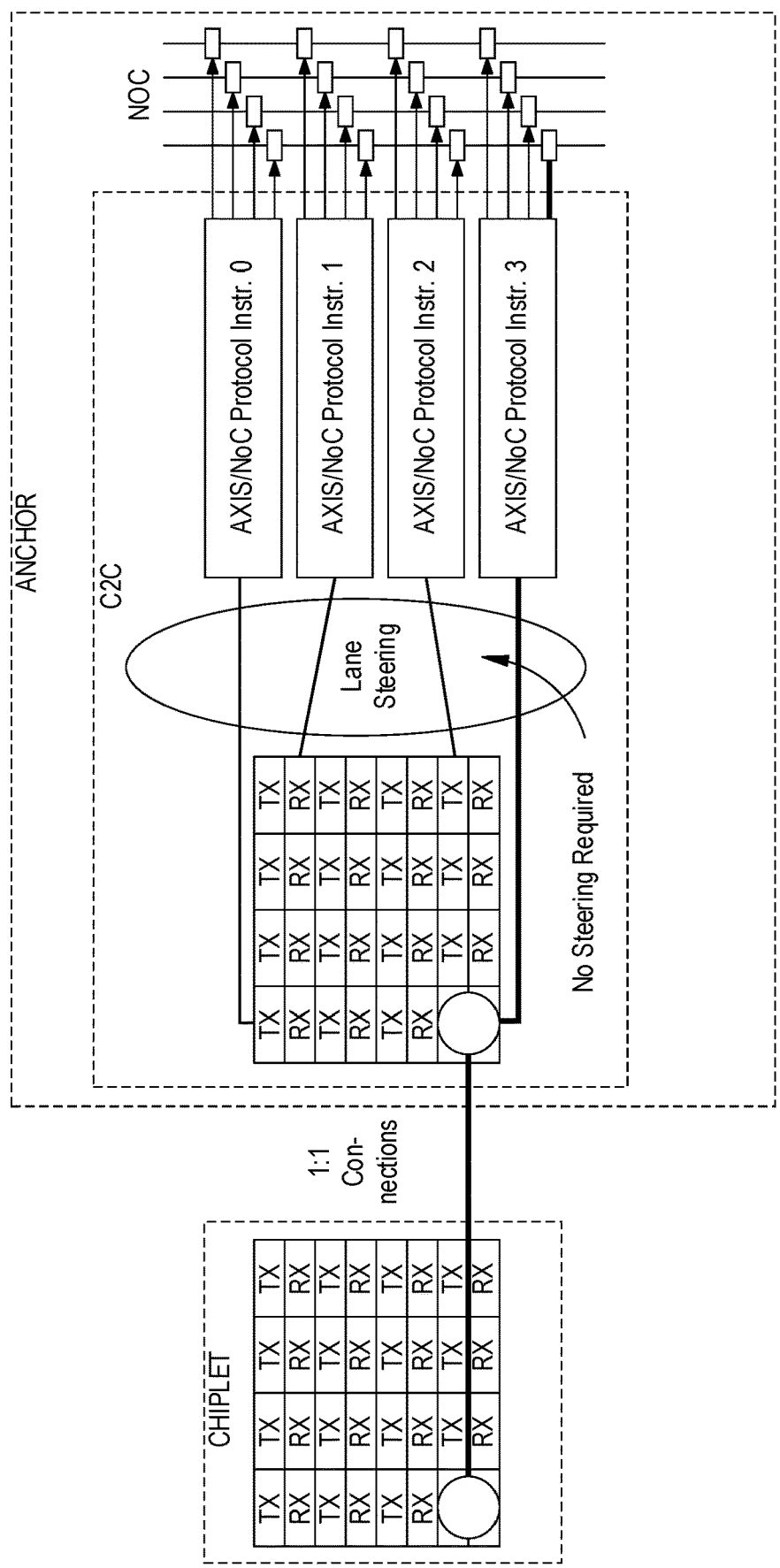
FIG. 5 depicts an example of connecting a non-rotated chiplet IC to the anchor IC, according to an example embodiment.

FIG. 5 depicts an example of connecting a non-rotated chiplet IC to the anchor IC, according to an example embodiment.

Figure 6:
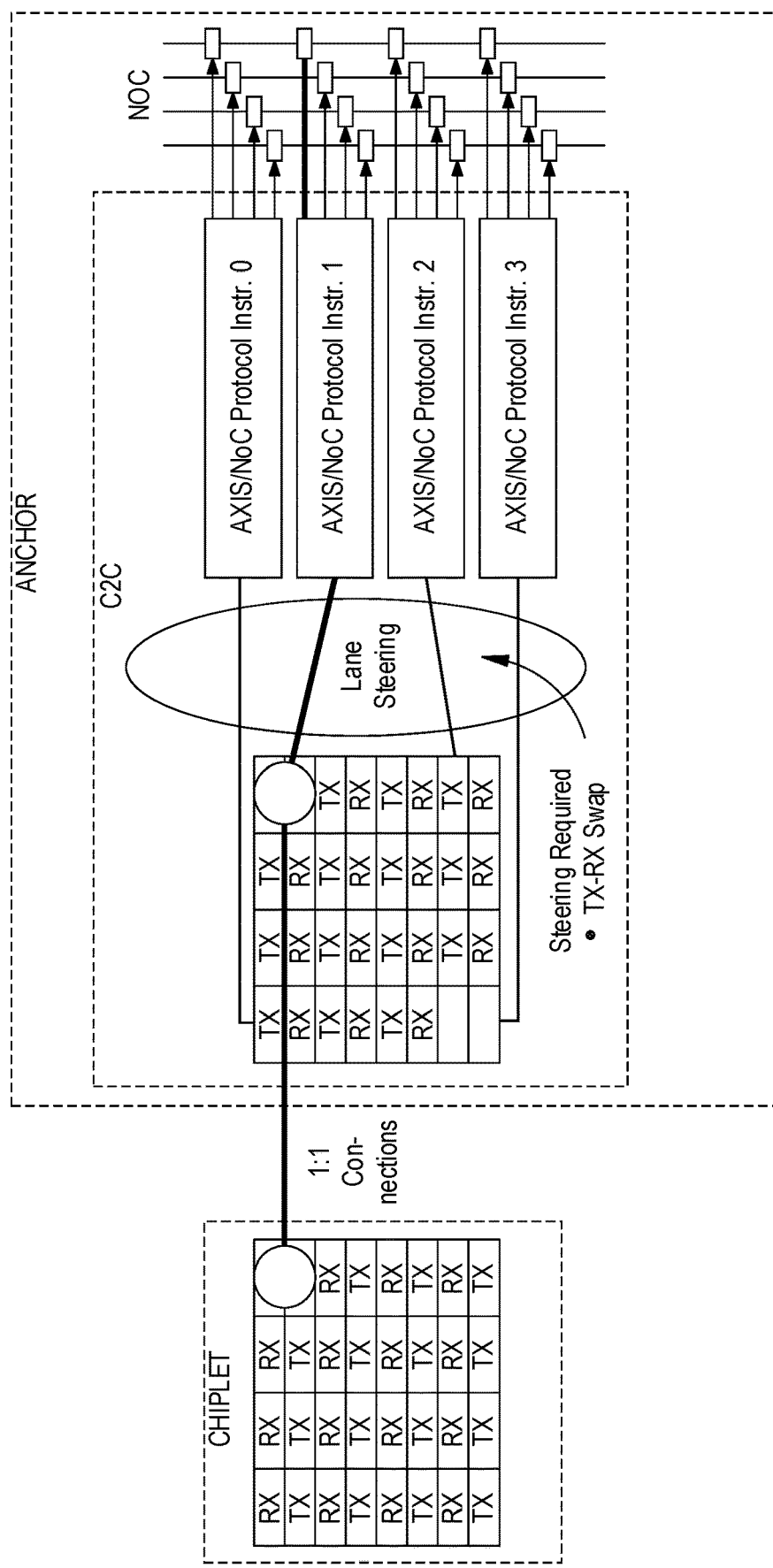
FIG. 6 depicts an example of connecting a rotated chiplet IC to the anchor IC, according to an example embodiment.

FIG. 6 depicts an example of connecting a rotated chiplet IC to the anchor IC, according to an example embodiment. In comparison between FIG. 5, as introduced above, the chiplet IC is rotated in FIG. 6.

FIGS. 5 and 6 depict connectivity changes when a chiplet is rotated relative to the anchor. FIG. 5 shows a baseline case where connections between the chiplet and the anchor are in a default state. In FIG. 6, the chiplet is rotated relative to the anchor. Upon rotation, two things may happen: (1) a bit-ordering within a DW reverses (as described above a shown with respect to the comparison of the arrows of FIG. 3) and (2) the DW ordering itself changes in both X and Y directions. For example, the transmit (TX) block at the top-left of the chiplet in FIG. 5 becomes a receive (RX) block at the top-left of the chiplet in FIG. 6. To handle such configurations, a lane-steering block that steers the DW from the chiplet (or to the chiplet) is provided such that, regardless of the orientation of the chiplet, the anchor sees a consistent connection with respect to the chiplet.

The FIGS. 5 and 6, when viewed together, show how, on the anchor side, it does not matter the orientation of the chiplet relative to the anchor when connected to the anchor. In some embodiments, while the description above focuses on integrating the C2C interface within an anchor, the C2C interface can be implemented as an IP in either or both of the anchor or a chiplet, as depicted in the IC 100 of FIG. 1. For example, the C2C interface may exist in the anchor where the anchor connects to the chiplet and in the chiplet where the chiplet connects to the anchor. When integrated into the anchor, the C2C interface can be integrated for a single chiplet connection or for multiple chiplet connections (for example, at one or more locations where chiplets can be connected). Thus, the C2C interface at the anchor may enable the anchor to be coupled to any chiplet with any configured functionality, while the C2C interface at the chiplet may enable the chiplet to be coupled to any anchor with a configured functionality. Such integration into one or both of the anchor or the chiplet enables the anchor to be used with any chiplets without adjustment or reconfiguration of the chiplet, in view of the ability to reprogram the registers of the C2C interface. Similarly, the chiplet, when comprising the C2C interface described herein, is enabled to be used with any anchor and may be connected to various or different locations of the anchor even if not specifically configured for the chiplet. In such instances, the re-configurability of the C2C interface, when integrated into the chiplet, enables the chiplet to be used with various anchors without configuration of the anchor, when appropriate.

When implemented as the IP, the C2C interface can be employed as a plug-and-play type element that, once integrated with a component, enables that component to be reprogrammable when connected to a corresponding component. As described above, when the C2C interface is integrated with the anchor, the anchor can be reprogrammed to enable the anchor to employ various configurations or functions. When integrated with the chiplet, the C2C interface may enable programming of the chiplet to enable or disable configuration options.

In some embodiments, the C2C interface may be a removable component that can be removed or installed on demand. In some embodiments, the programming interface described above enables the programming of the functionality of the anchor or chiplet with respect to the C2C interface.

As shown between comparing FIGS. 5 and 6, the rotation of the chiplet relative to the anchor results in a change of a location of DWs of the chiplet relative to the anchor. For example, transmit and receive DWs in block 601 move from a top left position as shown in FIG. 5 to a bottom right position as shown in FIG. 6, where the rotation results in the movement of the block 601 but also flipping the block 601 along a horizontal axis. This flipping changes an arrangement of how DWs from the block 601 are transmitted from the chiplet to the anchor. For example, as explained above, the DWs from the block 601 are flipped and reversed between the orientations in FIGS. 5 and 6. The lane steering and corresponding portions of the C2C interface can be configured to route the DWs appropriately and apply the proper protocols, etc., to the DWs regardless of the orientation and location of the block 601 and other blocks of the chiplet.

Figure 7A:
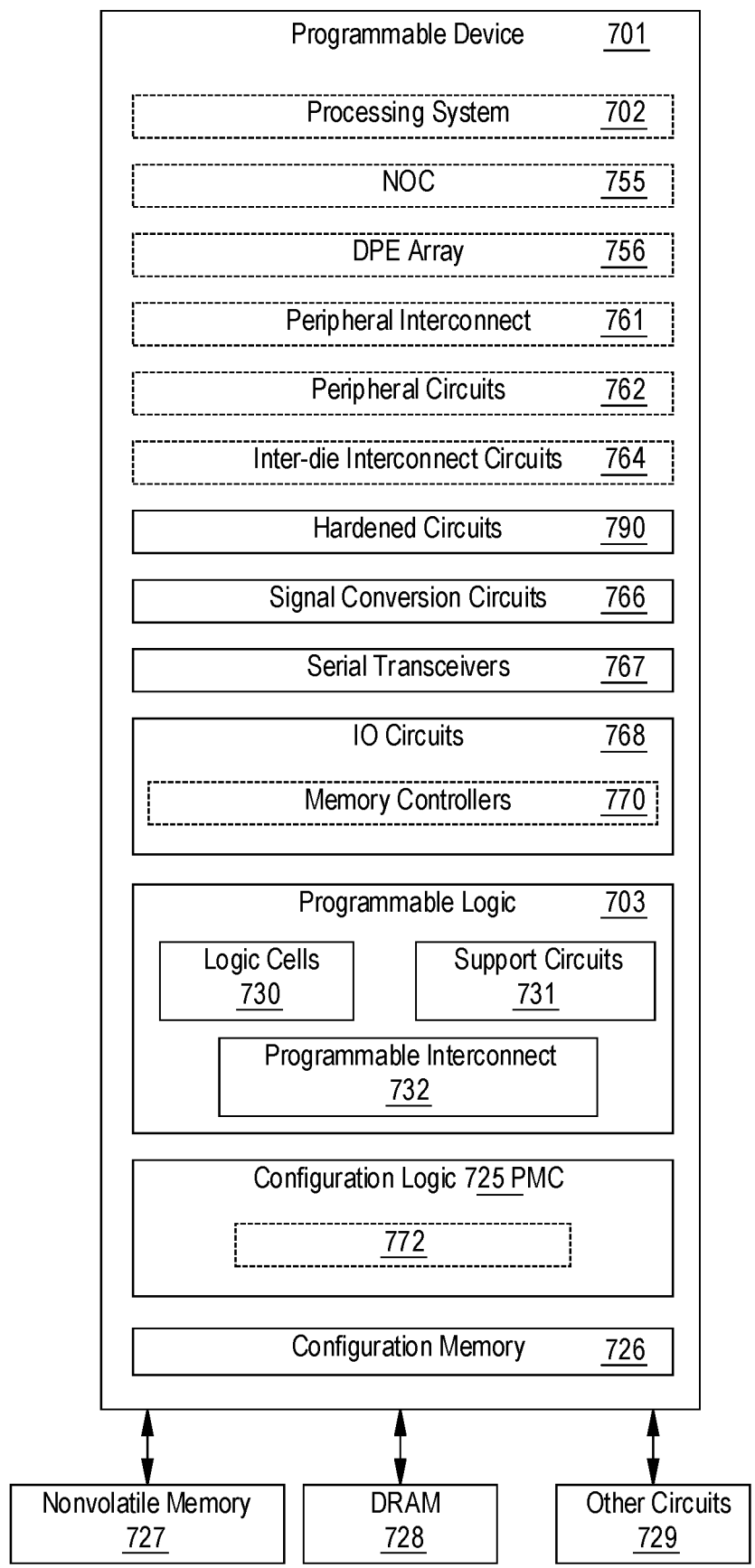
FIG. 7A is a block diagram depicting a programmable device, according to an example.

FIG. 7A is a block diagram depicting a programmable device 701 according to an example. The programmable device 701 includes programmable logic (PL) 703 (also referred to as a programmable fabric), input/output (IO) circuitries 768, serial transceivers 767, signal conversion circuitries 766, hardened circuitries 790, configuration logic 725, and configuration memory 726. The programmable device 701 can be coupled to external circuitries, such as nonvolatile memory 727, dynamic random access memory (DRAM) 728, and other circuitries 729. In various examples, the programmable device 701 further includes a processing system (PS) 702, a network-on-chip (NoC) 755, a data processing engine (DPE) array 756, peripheral interconnect 761, peripheral circuitries 762, and inter-die interconnect circuitries 764.

The PL 703 includes logic cells 730, support circuitries 731, and programmable interconnect 732. The logic cells 730 include circuitries that can be configured to implement general logic functions of a plurality of inputs. The support circuitries 731 include dedicated circuitries, such as digital signal processors, memories, and the like. The logic cells 730 and the support circuitries 731 can be interconnected using the programmable interconnect 732. Information for programming the logic cells 730, for setting parameters of the support circuitries 731, and for programming the programmable interconnect 732 is stored in the configuration memory 726 by the configuration logic 725. The configuration logic 725 can obtain the configuration data from the nonvolatile memory 727 or any other source (e.g., the DRAM 728 or from the other circuitries 729). In some examples, the configuration logic 725 includes a platform management controller (PMC) 772. The PMC 772 is configured to boot and configure the subsystems of the programmable device 701, such as the PL 703, the PS 702, the NoC 755, the DPE array 756, the signal conversion circuitries 766, the hardened circuitries 790, and the like.

The IO circuitries 768 provide an external interface for the subsystems of the programmable device 701, such as the PL 703, the PS 702, and the like. In some examples, the IO circuitries 768 include memory controllers 770 configured to interface external memories (e.g., the DRAM 728). Other connectivity circuitries can include the peripheral interconnect 761, the peripheral circuitries 762, and the inter-die interconnect circuitries 764. The peripheral interconnect 761 includes bus interface circuitries, such as peripheral component interconnect express (PCIe) circuitries and the like. The peripheral circuitries 762 include universal serial bus (USB) ports, Ethernet ports, universal asynchronous transceiver (UART) ports, serial peripheral interface (SPI) ports, general purpose IO (GPIO) ports, serial advanced technology attachment (SATA) ports, and the like. The inter-die interconnect circuitries 764 include circuitries configured to interface like inter-die interconnect circuitries in other programmable device(s) (e.g., for when the programmable device 701 is one die in a multi-die integrated circuit package). The serial transceivers 767 include high-speed transmit/receive circuitries configured to provide an external IO interface for the programmable device 701.

The PS 702 can include microprocessor(s), memory, support circuitries, IO circuitries, and the like. For example, the PS 702 may implement one or more of the anchor and chiplet discussed above in FIGS. 1-7. The NoC 755 is configured to provide for communication between subsystems of the programmable device 701, such as between the PS 702, the PL 703, the hardened circuitries 790, and the DPE array 756. The DPE array 756 can include an array of DPE's configured to perform data processing, such as an array of vector processors. The signal conversion circuitries 766 include analog-to-digital converters (ADCs) and digital-to-analog converters (DACs).

The hardened circuitries 790 comprise circuitries with predetermined functionality. A given hardened circuitry 790 can include one or more predetermined functions. Example hardened circuitries 790 include filters, mixers, sample-rate converters, transforms circuitries, and the like. A hardened circuitry 790 can be programmable to configure specific predetermined functionalities or select among predetermined functionalities. However, in contrast to a circuitry in the PL 703, a hardened circuitry 790 cannot be configured or reconfigured with different functionality. For example, a hardened circuitry 790 can include a filter having two predetermined and selectable functionalities. A third functionality cannot be added to the hardened circuitry 790, nor can one of the two functionalities be removed from the hardened circuitry 790. In contrast, a filter configured in the PL 703 can be reconfigured to add one more additional functionalities or to remove one or more functionalities. Further, a filter configured in the PL 703 can be removed entirely and replaced with another circuitry. In contrast, a hardened circuitry 790 cannot be removed from the programmable device 701 (but can be unused if desired).

Figure 7B:
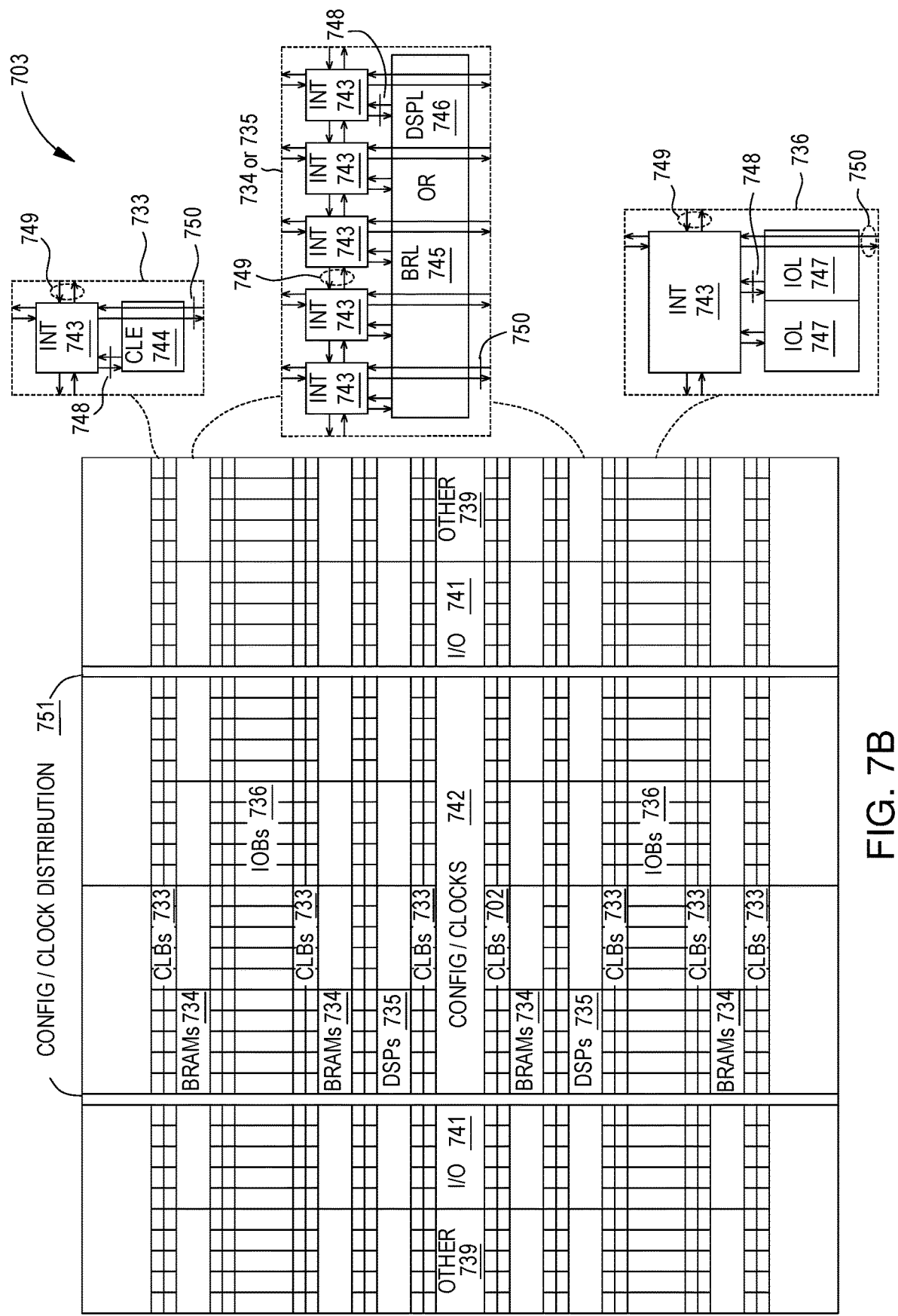
FIG. 7B illustrates a field programmable gate array (FPGA) implementation of the PL, according to an example.

FIG. 7B illustrates a field programmable gate array (FPGA) implementation of the PL 703 according to an example. The PL 703 shown in FIG. 7B can be used in any example of the programmable devices described herein. The PL 703 includes a large number of different programmable tiles including configurable logic blocks ("CLBs") 733, random access memory blocks ("BRAMs") 734, input/output blocks ("IOBs") 736, configuration and clocking logic ("CONFIG/CLOCKS") 742, digital signal processing blocks ("DSPs") 735, specialized input/output blocks ("I/O") 741 (e.g., configuration ports and clock ports), and other programmable logic 739 such as digital clock managers, analog-to-digital converters, system monitoring logic, and so forth.

In some PLs 703, each programmable tile can include at least one programmable interconnect element ("INT") 743 having connections to input and output terminals 748 of a programmable logic element within the same tile, as shown by examples included at the top of FIG. 7B. Each programmable interconnect element 743 can also include connections to interconnect segments 749 of adjacent programmable interconnect element(s) in the same tile or other tile(s). Each programmable interconnect element 743 can also include connections to interconnect segments 750 of general routing resources between logic blocks (not shown). The general routing resources can include routing channels between logic blocks (not shown) comprising tracks of interconnect segments (e.g., interconnect segments 750) and switch blocks (not shown) for connecting interconnect segments. The interconnect segments of the general routing resources (e.g., interconnect segments 750) can span one or more logic blocks. The programmable interconnect elements 743 taken together with the general routing resources implement a programmable interconnect structure ("programmable interconnect") for the illustrated PL.

In an example implementation, a CLB 733 can include a configurable logic element ("CLE") 744 that can be programmed to implement user logic plus a single programmable interconnect element ("INT") 743. A BRAM 734 can include a BRAM logic element ("BRL") 745 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 735 can include a DSP logic element ("DSPL") 746 in addition to an appropriate number of programmable interconnect elements. An IOB 736 can include, for example, two instances of an input/output logic element ("IOL") 747 in addition to one instance of the programmable interconnect element 743. As will be clear to those of skill in the art, the actual I/O pads connected, for example, to the I/O logic element 747 typically are not confined to the area of the input/output logic element 747.

In the pictured example, a horizontal area near the center of the die (shown in FIG. 7B) is used for configuration, clock, and other control logic. Vertical columns 751 extending from this horizontal area or column are used to distribute the clocks and configuration signals across the breadth of the PL.

Some PLs utilizing the architecture illustrated in FIG. 7B include additional logic blocks that disrupt the regular columnar structure making up a large part of the PL. The additional logic blocks can be programmable blocks and/or dedicated logic.

Note that FIG. 7B is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 7B are purely exemplary. For example, in an actual PL more than one adjacent row of CLBs is typically included wherever the CLBs appear, to facilitate the efficient implementation of user logic, but the number of adjacent CLB rows varies with the overall size of the PL.

Figure 7C:
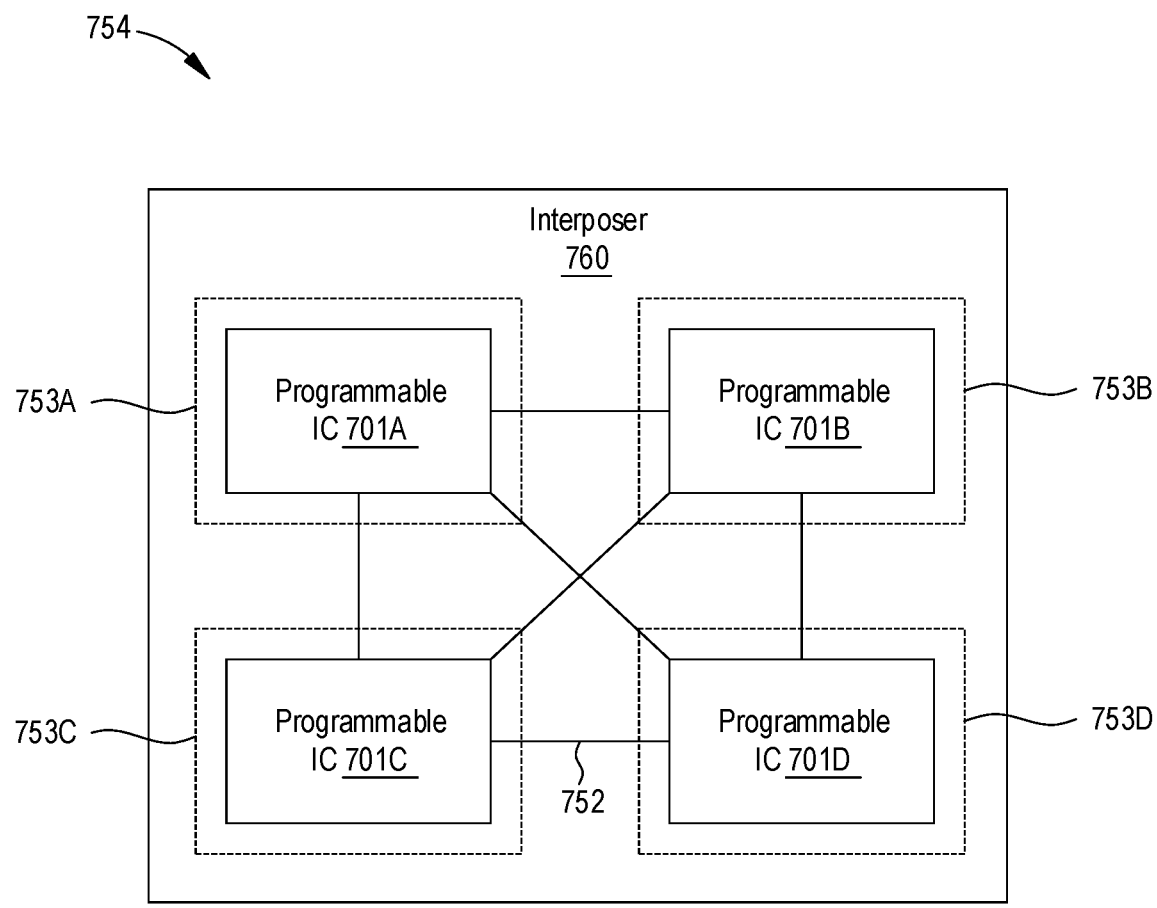
FIG. 7C is a block diagram depicting a multi-die programmable device, according to an example.

FIG. 7C is a block diagram depicting a multi-die programmable device 754 according to an example. The multi-die programmable device 754 includes a plurality of programmable devices 701, e.g., programmable devices 701A, 701B, 701C, and 701D. In an example, each programmable device 701 is an IC die disposed on an interposer 760. Each programmable device 701 comprises a super logic region (SLR) 753 of the programmable device 754, e.g., SLRs 753A, 753B, 753C, and 753D. The programmable devices 701 are interconnected through conductors on the interposer 760 (referred to as super long lines (SLLs) 52) and inter-die interconnect circuitries 764 disposed within each of the programmable devices 701. Although the programmable devices 701A, 701B, 701C, and 701D are shown side-by-side in FIG. 7C, one or more of the programmable devices 701A, 701B, 701C, and 701D may be stacked. The programmable ICs could form the C2C interfaces compiler described above with reference to FIGS. 1-6.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or apparatus, and the like. Accordingly, aspects may take the form of an entirely hardware embodiment or a combination of hardware products or an embodiment combining hardware aspects with corresponding programming that may all generally be referred to herein as a "circuitry" or "system." Furthermore, certain aspects, such as programmable logic blocks, lookup tables (LUTs), and the like, may take the form of hardware components that can be controlled using corresponding programming.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations or programming for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and apparatuses according to various examples of the present invention. In this regard, each block in the flowchart or block diagrams may represent a circuitry, programming for such circuitry, or portion of instructions for such circuitry, which comprises one or more executable instructions for controlling or programming the circuitry to perform the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
    an anchor IC comprising a:
        a processor IC; and
        a memory IC configured to store one or more programs that, when executed by the processor IC, perform one or more operations;
    a plurality of chiplet ICs configured to provide a function when coupled with the anchor IC via a plurality of chip-to-chip (C2C) interfaces residing in the anchor IC and the chiplet ICs, each chiplet IC comprising:
        one or more requirements for a corresponding C2C interface of the plurality of C2C interfaces via which the chiplet IC connects to the anchor IC; and
        one or more performance requirements for the anchor IC, and wherein each of the plurality of C2C interfaces of the anchor IC is configured to:
            receive data from one chiplet IC of the plurality of chiplet ICs regardless of a functionality of the one chiplet; and
            individually couple the one chiplet IC to the anchor IC; and
    wherein the one or more operations comprise a programmable option for the anchor IC to interface in different combinations and arrangements of the chiplet ICs to provide different functions.

2. The IC of claim 1, wherein one or more of the plurality of C2C interfaces is integrated as part of the anchor IC die.

3. The IC of claim 2, wherein each C2C interface of the plurality of C2C interfaces, when integrated as part of the anchor IC die, is further configured to couple a corresponding chiplet IC die to the anchor IC die such that the corresponding chiplet IC die provides a corresponding function to the anchor IC die regardless of an orientation of the chiplet IC die with respect to the anchor IC die.

4. The IC of claim 1, wherein one or more of the plurality of C2C interfaces is integrated as part of one of the plurality of chiplet IC dies.

5. The IC of claim 1, wherein the plurality of chiplet IC dies comprise different chiplet IC dies configured to provide different functions to the anchor IC die.

6. The IC of claim 1, wherein the anchor IC die is configured to be integrated with a set of chiplet IC die of the plurality of chiplet IC dies to provide a device based on the anchor IC die.

7. The IC of claim 1, wherein the programmable option further comprises:
    a streaming protocol, an Advanced eXtensible Interface (AXI-MM) or a pass-through protocol.

8. The IC of claim 1, wherein the plurality of C2C interfaces is configured to support multiple data flow protocols via selections by a software programming model.

9. The IC of claim 1, wherein the programmable option is configured to be enabled or disabled using a software programming model.

10. An electronic device, comprising:
    an anchor integrated circuit (IC) die;
    a plurality of chiplet IC dies configured to provide a function when coupled to the anchor IC die via a plurality of chip-to-chip (C2C) interfaces, each chiplet IC die comprising:
        one or more requirements for a corresponding C2C interface of the plurality of C2C interfaces via which the chiplet IC die couples to the anchor IC die; and
        one or more performance requirements for the anchor IC die, and the plurality of C2C interfaces, each C2C interface configured to:
            receive data from one chiplet IC die of the plurality of chiplet IC dies regardless of a functionality of the one chiplet IC die; and
            individually couple the one chiplet IC die to the anchor IC die to form a multi-die IC device;
    wherein the C2C interface comprises a protocol selected from the group consisting of a streaming protocol, an Advanced eXtensible Interface (AXI-MM) and a pass-through protocol selected by registers of the C2C interface, the protocol configured to enable the anchor IC die to interface in different combinations and arrangements with the plurality of chiplet IC dies to configure features and functions of the electronic device.

11. The electronic device of claim 10, wherein the plurality of C2C interfaces is integrated as part of the anchor IC die.

12. The electronic device of claim 11, wherein each C2C interface of the plurality of C2C interfaces, when integrated as part of the anchor IC die, is further configured to couple a corresponding chiplet IC die to the anchor IC die such that the corresponding chiplet IC die provides a corresponding function to the electronic device regardless of an orientation of the chiplet IC die with respect to the anchor IC die.

13. The electronic device of claim 10, wherein the plurality of C2C interfaces is integrated as part of the plurality of chiplet IC dies.

14. The electronic device of claim 10, wherein the plurality of C2C interfaces is integrated as part of each of the anchor IC die and the plurality of chiplet IC dies.

15. The electronic device of claim 10, wherein the plurality of chiplet IC dies comprise different chiplet IC dies configured to provide different functions to the electronic device.

16. The electronic device of claim 10, wherein the streaming protocol comprises an Advanced eXtensible Interface streaming (AXI-S) based streaming protocol, a Credited eXtensible Stream (CXS) streaming protocol, or a collection of wires (COW) streaming protocol.

17. The electronic device of claim 10, wherein the plurality of C2C interfaces is configured to support multiple data flow protocols via selections by a software programming model.

18. The electronic device of claim 10, wherein the protocol is configured to be enabled or disabled using a software programming model.

19. A method comprising:
configuring each chiplet integrated circuit (IC) die of a plurality of chiplet IC dies to provide a corresponding function when coupled to an anchor IC die via a plurality of corresponding chip-to-chip (C2C) interfaces;
configuring each chiplet IC of the plurality of chiplet IC dies to have one or more requirements for corresponding C2C interface of the plurality of C2C interfaces via which the chiplet IC die couples to the anchor IC die;
configuring each chiplet IC die of the plurality of chiplet IC dies to have one or more performance requirements for the anchor IC die;
configuring each C2C interface of the plurality of C2C interfaces to:
receive one chiplet IC die of the plurality of chiplet IC dies regardless of a functionality of the one chiplet IC die; and
individually couple the one chiplet IC die to the anchor IC die to form a multi-die IC device; and
configuring the anchor IC die to provide one or more programmable options to interface in different combinations and arrangements with the plurality of chiplet IC dies to configure features and functions of a device comprising the anchor IC die and the chiplet IC dies.

20. The method of claim 19, further comprising integrating the plurality of C2C interfaces as part of the anchor IC die.

* * * * *